Figure 1:
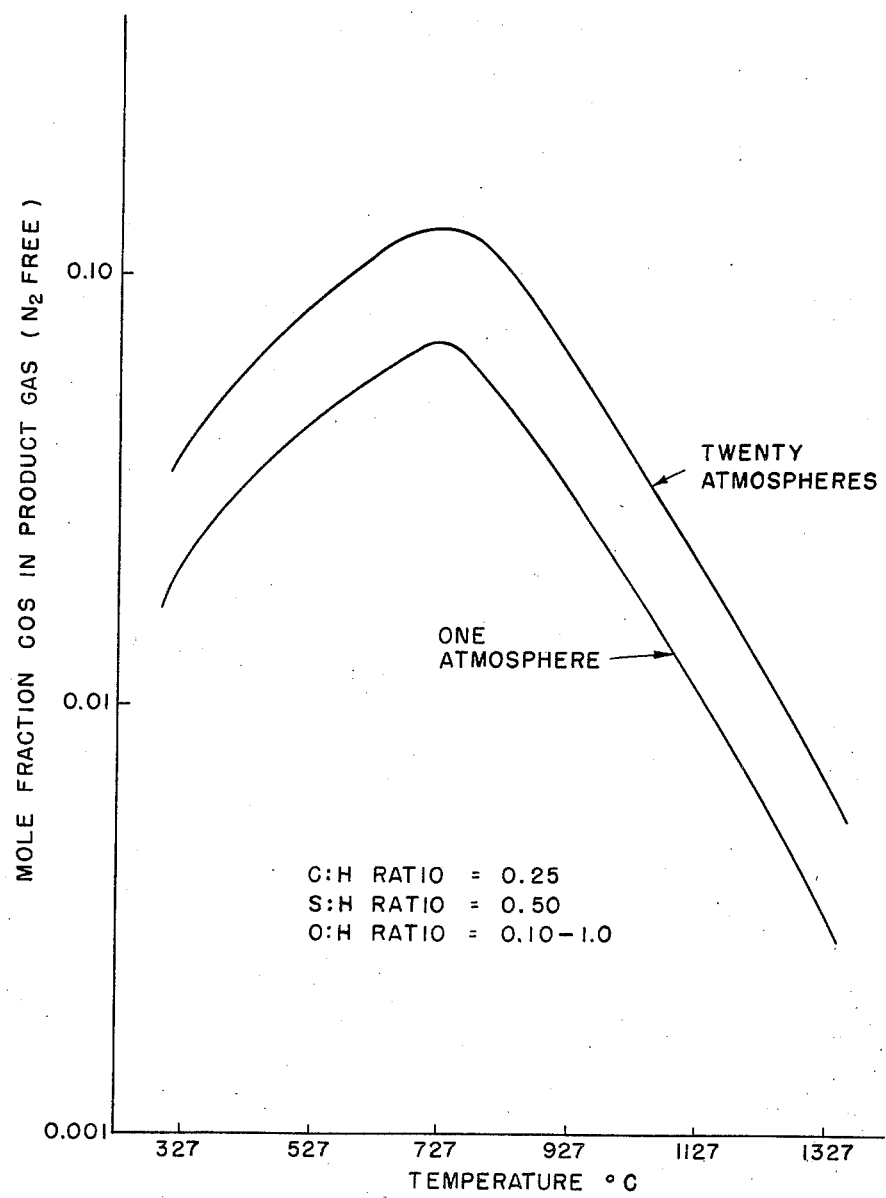

INVENTORS
WILLIS A. ADCOCK
WILLIAM C. LAKE
BY
ATTORNEY

Patent 2,809,097

PROCESS FOR PREPARATION OF CARBONYL SULFIDE AND CARBON DISULFIDE

Willis A. Adcock, Dallas, Tex., and William C. Lake, Tulsa, Okla., assignors to Pan American Petroleum Corporation, a corporation of Delaware Application June 16, 1954, Serial No. 437,033

9 Claims. (Cl. 23—203)

Our invention relates to a method for the preparation of carbonyl sulfide (COS) and carbon disulfide ($CS_2$). More particularly, it is concerned with novel conditions employed in the manufacture of these materials from hydrocarbons, air or carbon dioxide, and elemental sulfur or from compounds which under the conditions employed yield free sulfur.

It is an object of our invention to provide an improved method for the preparation of carbonyl sulfide and carbon disulfide from relatively cheap, readily available starting materials. It is another object of our invention to provide a process for the preparation of the aforesaid materials which may be readily integrated into the operation of a plant recovering sulfur from sour natural gas. It is a still further object of our invention to provide a method for the preparation of said materials wherein the preheat required for the reactants may be supplied entirely from the reaction itself or from the sensible heat in the product gas.

In carrying out the process of our invention, sulfur vapors, a hydrocarbon and air or carbon dioxide are preheated to a temperature of from about 425° to 475° C. and introduced into a suitable reaction zone maintained at a temperature ranging from about 525° to about 925° C., preferably at from about 650° to about 775° C. The atomic ratios of O:H may range from about 0.1 to about 2.0, the S:H ratio may vary from about 0.2 to about 1.0 and the C:H ratio may range from about 0.2 to about 1.2. A catalyst may or may not be employed in effecting reaction between oxygen, sulfur and the desired hydrocarbon. The reaction may be carried out at pressures of from, for example, atmospheric to pressure of about 40 atmospheres, preferably in the neighborhood of about 20 atmospheres. The hot reaction products containing carbonyl sulfide, carbon disulfide, and hydrogen sulfide, together with unconverted sulfur and hydrocarbon, are withdrawn from the reaction zone and sent to a suitable heat exchanger where they are brought into indirect heat exchange with a cooler gaseous stream of hydrocarbon and air or carbon dioxide. A portion of the hot product stream may also be used to vaporize the elemental sulfur or to preheat the compound which releases sulfur vapors prior to introducing the latter with the hot hydrocarbon and air or carbon dioxide into the reaction zone. Because of the highly exothermic nature of the reaction involved, an excess of heat is produced over the feed preheat requirements. Accordingly, the balance of the heat should be removed in any convenient manner from the reaction zone. Thereafter the temperature of the cooled product gases is further reduced by subjecting said gases to condensation at a temperature of 65° to 90° C. whereby unconverted sulfur is recovered in liquid form and returned to the sulfur feeding system where it may be subsequently vaporized. Product gases containing carbonyl sulfide, carbon disulfide, and hydrogen sulfide are then treated in accordance with the detailed description appearing below whereby product carbonyl sulfide and carbon disulfide are recovered.

At given S:H and O:H feed ratios and at a fixed temperature, the yield of carbonyl sulfide increases with pressure while the quantity of carbon disulfide produced is somewhat lowered. At fixed feed ratios of S:H, C:H and O:H, the yield of carbon disulfide increases with increasing temperature at a given pressure. At any pressure, the yield of carbonyl sulfide increases to a maximum at about 725° C. and decreases thereafter with increasing temperature.

Within the atomic feed ratios of S:H, O:H and C:H set forth above, the concentration of carbon in the system is preferably such that carbon deposition, although just on the verge of occurring, can be avoided. It is under such conditions of impending carbon deposition at a given temperature and pressure that we have found the highest conversions to carbon disulfide and carbonyl sulfide to occur. We have further found that operation of the reaction under conditions of imminent carbon deposition to be extremely important and any material variation from the O:H or S:H ratios specified above results in a drastic decrease in the formation of desired products. Thus, if under suitable conditions of fixed temperature, pressure and S:H and C:H feed ratios, the O:H ratio is increased to a point where carbon deposition is no longer imminent, product yields drop off sharply. On the other hand, if the O:H ratio is decreased to a point where carbon deposition occurs to an appreciable extent, the activity of the catalyst, if present, is reduced to such an extent that further operation is no longer economical.

The catalyst which may be employed in carrying out the process of our invention comprise a relatively large group of compounds, including silica gel and the sulfides of zinc, calcium, cadmium, chromium, vanadium, titanium and the like. These materials may be used as such to promote the involved reaction and may be placed on supports such as pumice, fuller's earth, various clays, etc., to constitute suitable catalysts. While it may be generally desirable to carry out the process of our invention in the presence of such a catalyst, we do not consider it essential to do so in order to obtain carbon disulfide and carbonyl sulfide in accordance with the novel conditions of operation set forth herein.

Space velocities used in the process of our invention may be varied within relatively wide limits with comparatively little change in the conversion secured. Maximum space velocities depend principally on the desired quantity of the reactants converted per pass. At a given temperature, conversions decrease with increasing space velocities. However, conversions may be held substantially constant at increasing space velocities if the temperature is simultaneously increased. Under the conditions of our process, space velocities of from about 600 to about 3000 S. C. F. H. reactants per cubic foot of catalyst will generally be found satisfactory when operating in the absence of a catalyst. Residence times of the reactants in the reaction zone may vary from about 0.5 to about 1 second.

As examples of hydrocarbon feeds which may be used in carrying out the process of our invention, there may be mentioned the normally gaseous hydrocarbons. Of these materials, methane is generally preferred—a convenient source thereof being natural gas. Also, gaseous hydrocarbons of the type found in refinery gases may be used. Moreover, refinery gases resulting from the processing of sour crudes may be employed as a source of both hydrogen sulfide and of the necessary hydrocarbon.

The effects of the above-mentioned conditions of temperature and pressure on carbonyl sulfide yield when employing, for example, a mixture of methane, air and sulfur are shown by the curves appearing in Figure 1. The ratios of C:H, O:H, and S:H employed in securing this information also appear in Figure 1. These curves clearly point out the effect of increasing pressure on carbonyl sulfide yields as well as the desirability of maintaining the reaction temperatures within the range of from about 525° to about 925° C., the optimum temperature appearing to be in the neighborhood of 725° C. Similar effects are obtained when carbon dioxide is substituted for air in this system.

Figure 2:
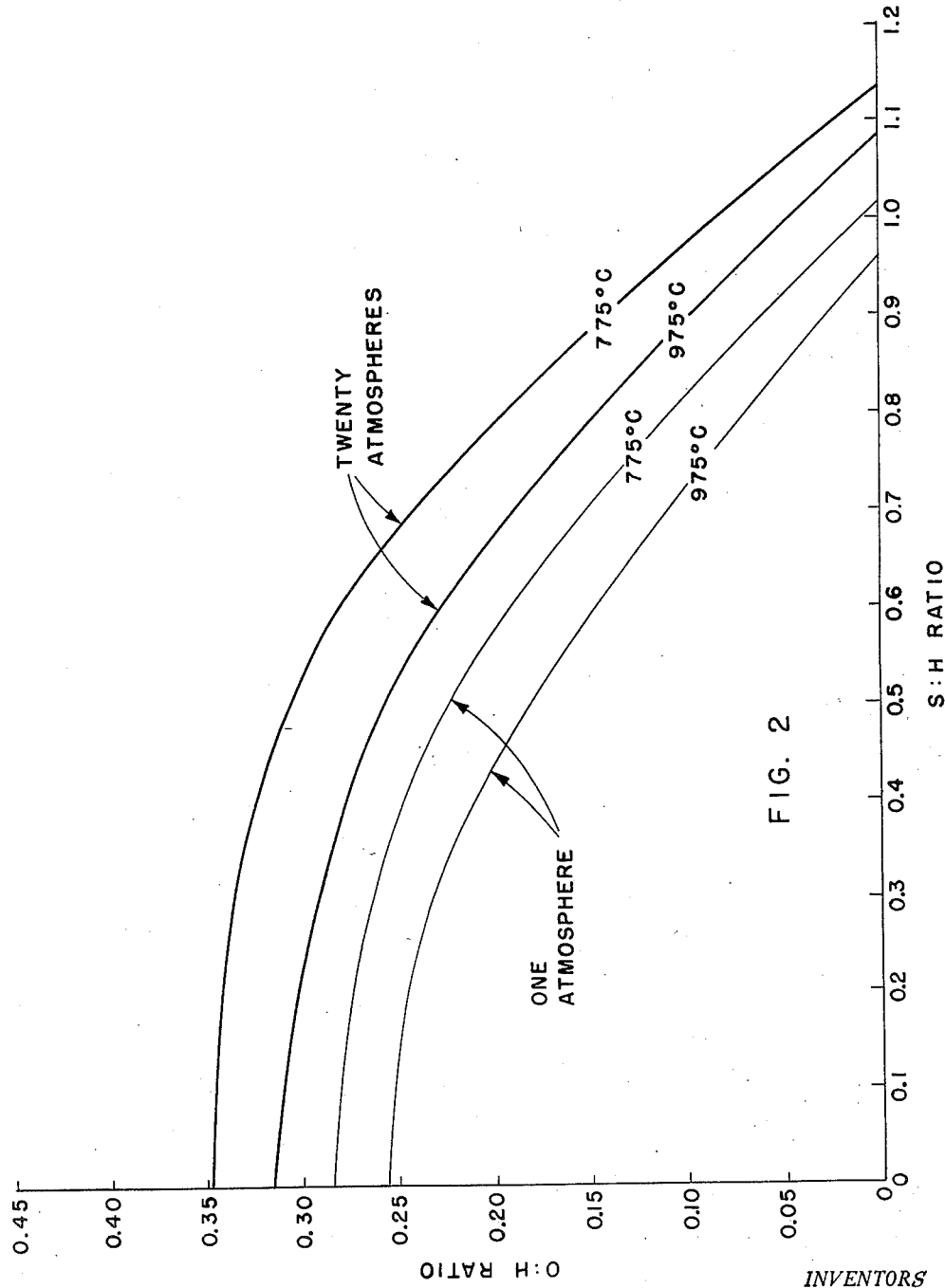

As has been previously pointed out, we desire to operate under conditions of impending carbon deposition in the system because we have found that under such conditions yields of both carbon disulfide and carbonyl sulfides are at a maximum. The curves appearing in Figure 2 show the various feed ratios, methane, sulfur and air, that may be employed with a fixed C:H ratio of 0.250 and still operate in the region of imminent carbon deposition. Carbonyl sulfide yields increase with increasing ratios of S:H and O:H; just above a value of about 0.5 for both the S:H and the O:H ratios, the increase in carbonyl sulfide production tends to level off. Accordingly, it may be seen from the set of curves in Figure 2 that little or no advantage is to be gained by operating at S:H ratios in excess of about 0.5; the reason for this being that an increase in S:H ratio above 0.5 is balanced by a corresponding decrease in O:H ratio resulting in a substantially constant yield of carbonyl sulfide. The O:H ratio must be decreased under such circumstances in order for the system to remain near the carbon deposition point where, as previously stated, maximum yields of carbonyl sulfide are secured.

Figure 3:
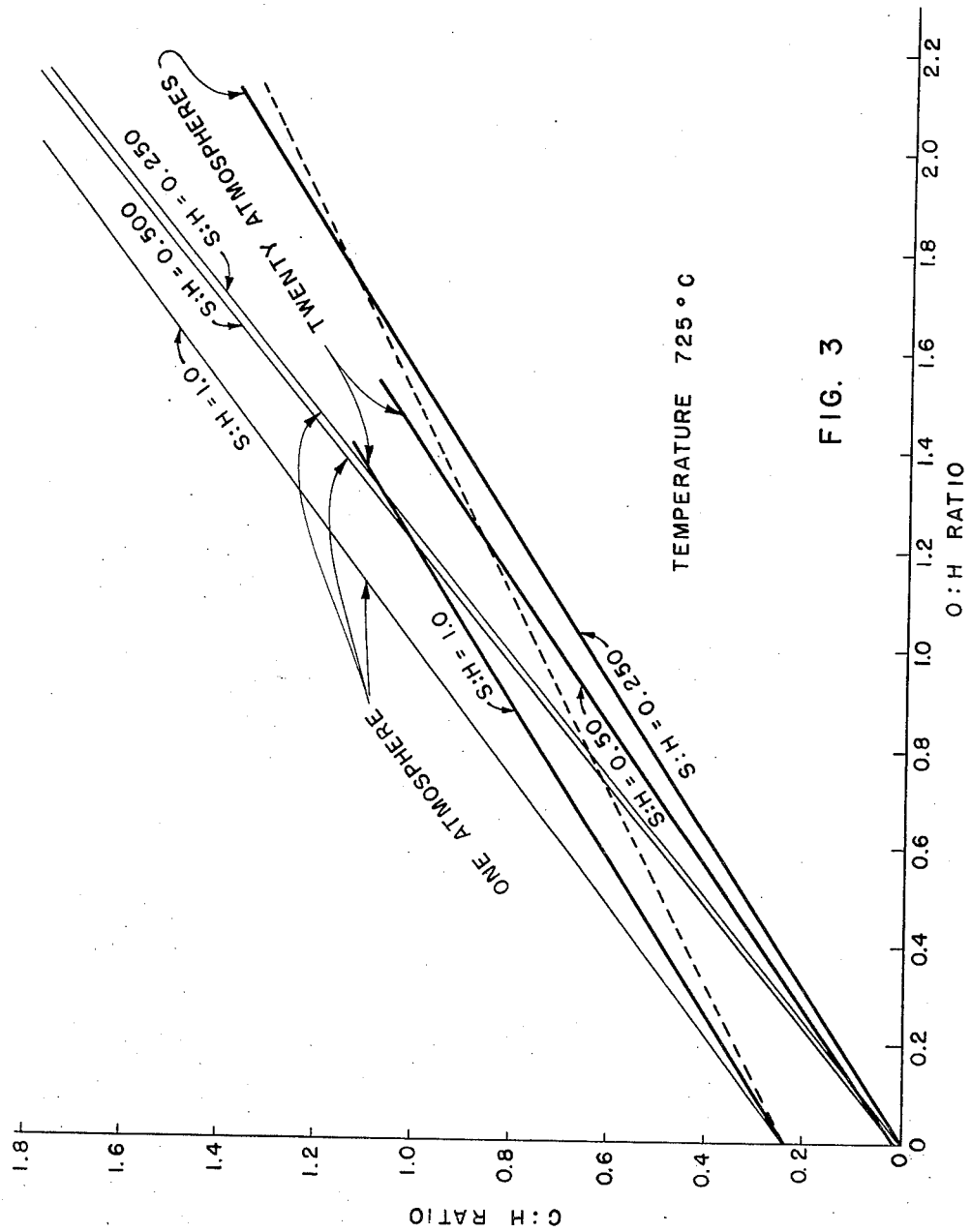

Figure 3 is a plot of the relationship between the O:H and C:H ratios for various S:H ratios at 725° C. and at pressures of 1 and 20 atmospheres. With a feed of methane, carbon dioxide and sulfur, the relationship between O:H and C:H is fixed as shown by the dotted line. The S:H ratio to be employed with the required O:H and C:H ratios is determined by the point at which a given S:H ratio curve shown therein intersects the dotted line. Thus, it may be seen from the graph that as we proceed from left to right along the dotted line, as the O:H ratio is increased, the S:H ratio must be decreased. Since carbonyl sulfide yields remain practically constant when the O:H ratio is increased above 0.5 and since the carbonyl sulfide yield decreases as the S:H ratio is decreased, it is apparent from the graph that operation above an O:H ratio of about 0.5 results in decreased carbonyl sulfide yields. Although the S:H ratio increases as the O:H ratio is decreased, the combination of these effects results in practically no increase in carbonyl sulfide yield. Therefore, operation at an O:H ratio near or slightly below 0.5 results in highest yields of carbonyl sulfide.

One of the desirable features of the process of our invention is that relatively cheap starting materials may be employed. Such materials are frequently obtainable from the same plant site. In recent years plants producing sulfur from sour natural gas have become rather common and are an outgrowth of certain conservation regulations laid down for the purpose of preventing indiscriminate waste of these natural resources. Thus, free sulfur may be combined with sweetened natural gas produced at the same plant and subjected to the reaction conditions herein set forth in the presence of air or carbon dioxide to secure both carbonyl sulfide and carbon disulfide in economically desirable yields.

The following table indicates results which may be obtained when operating in the absence of a catalyst and within the ranges of temperature, pressure and atomic ratios taught herein using methane or methane and carbon dioxide as the carbon source. In the table, runs 1–4 employ air as the oxygen source while runs 5 and 6 use carbon dioxide. The figures appearing under each of the runs listed below show the concentration of the corresponding components present in the reactor tail gas.

TABLE 1

| Components of Reactor Tail Gas | Run 1—777° C. 1 Atmosphere S/H ratio=0.5 O/H ratio=0.23 C/H ratio=0.25 Mol Percent | Run 2—977° C. 1 Atmosphere S/H ratio=0.5 O/H ratio=0.18 C/H ratio=0.25 Mol Percent | Run 3—1,377° C. 1 Atmosphere S/H ratio=0.5 O/H ratio=0.09 C/H ratio=0.25 Mol Percent | Run 4—977° C. 20 Atmospheres S/H ratio=0.5 O/H ratio=0.31 C/H ratio=0.25 Mol Percent | Run 5—777° C. 1 Atmosphere S/H ratio=0.7 O/H ratio=0.5 C/H ratio=0.5 Mol Percent | Run 6—777° C. 20 Atmospheres S/H ratio=0.85 O/H ratio=0.5 C/H ratio=0.5 Mol Percent |
|---|---|---|---|---|---|---|
| CO | 20.0 | 21.0 | 11.0 | 14.0 | 27.5 | 10.5 |
| $H_2$ | 20.0 | 21.0 | 47.0 | 9.0 | 2.4 | 0.5 |
| $H_2O$ | 0.4 | 0.1 | | 5.5 | 0.6 | 1.1 |
| $CO_2$ | 2.0 | 0.1 | | 5.0 | 4.3 | 5.0 |
| COS | 7.0 | 2.5 | 0.4 | 13.0 | 14.0 | 30.0 |
| $S_2$ | 0.5 | 0.9 | 3.6 | 0.1 | 0.2 | 0.1 |
| $CH_4$ | 0.1 | 0.1 | | 0.7 | 0.3 | 0.7 |
| $CS_2$ | 5.0 | 8.3 | 22 | 0.7 | 4.5 | 4.1 |
| $H_2S$ | 45.0 | 46.0 | 16.0 | 52.0 | 46.2 | 48.0 |

From the data appearing in the above table, the marked effect of temperature and presure on carbonyl sulfide and carbon disulfide yields is readily seen when using either air or carbon dioxide as the oxygen source. Also, it is to be noted that under otherwise identical conditions, higher yields of carbonyl sulfide and carbon disulfide (usually) are realized with carbon dioxide than when air is employed as the oxygen source.

Figure 4:
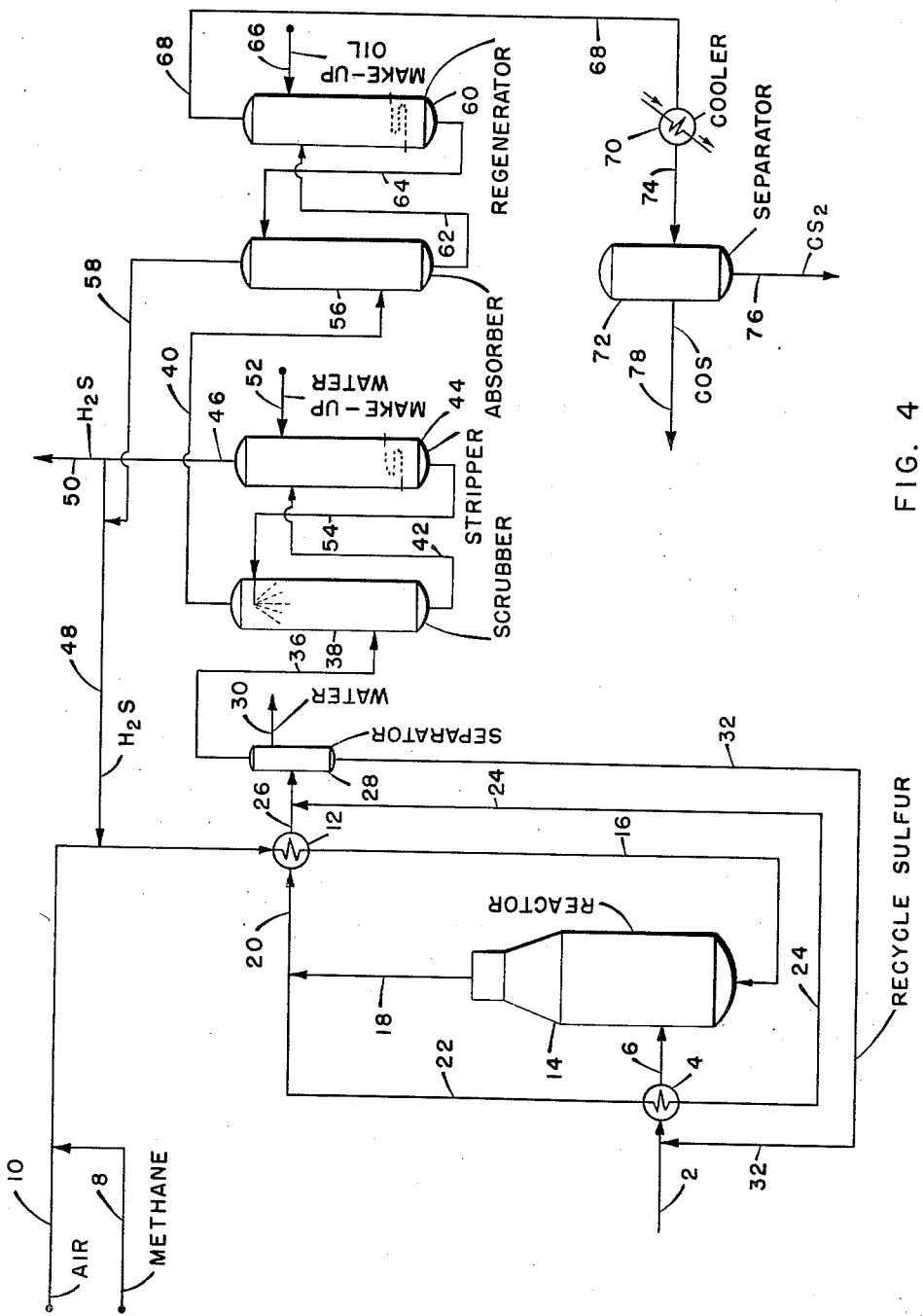

The process of our invention may be further illustrated by reference to Figure 4 which represents a flow diagram of an ambodiment of the invention. Free sulfur is supplied through line 2 to heat exchanger 4 where the sulfur is vaporized at a temperature of, for example, from 475° to about 775° C. A suitable hydrocarbon gas, such as methane, in line 8 is mixed with air in line 10 and these gases are preheated in exchanger 12 with hot product gases from reactor 14 formed under conditions hereinafter described in greater detail. The mixture of methane and air which is now at a temperature of, for example, about 475° C., is conducted through line 16 into reactor 14 where said mixture contacts sulfur vapors generated in exchanger 4 and introduced into the reactor via line 6. The composition of the fresh feed to the reactor is as follows (mol percent): sulfur, 33.3; methane, 24.0; oxygen, 9.0; plus 33.7 percent nitrogen. Temperature maintained in the reactor is about 775° C. and the pressure is approximately 1 atmosphere. Hot product gas at 775° C. is taken off through line 18 and divided with substantially equal portions going to lines 20 and 22 where it passes into heat exchangers 12 and 4 respectively. Gas issuing from exchanger 4 is taken through line 24 combined with cool (80° C.) product gas in line 26 and introduced into separator 28 where product water and free sulfur are removed via lines 30 and 32 respectively. The sulfur in line 32 is conducted back to line 2 where it is mixed with additional sulfur and vaporized in exchanger 4 as previously described. Product gas containing carbonyl sulfide, carbon disulfide, and hydrogen sulfide is withdrawn from the separator through line 36. This gas is taken to the bottom of scrubbing tower 38 where it meets a descending shower of water droplets which selectively dissolves the hydrogen sulfide permitting carbonyl sulfide and carbon disulfide to pass on out the tower through line 40. Water containing dissolved hydrogen sulfide is removed through line 42 and taken to a stripper through line 44 where the liberated hydrogen sulfide is taken off overhead through line 46 and a portion thereof is recycled to line 10 via line 48 and mixed with the feed to the reactor 14. The remainder of the hydrogen sulfide thus obtained (28.4 mols based on 100 mols product gas, plus nitrogen) is taken off through line 50 and sent, for example, to a suitable surfur recovery unit. Makeup water is added to the hydrogen sulfide removal system when needed through line 52. Water, lean in hydrogen sulfide, is returned through line 54 to the top of scrubber 38. The carbonyl sulfide and carbon disulfide, together with gases such as carbon monoxide, carbon dioxide, hydrogen, etc., are introduced into absorber 56, operated at about 35° C., where a descending stream of a suitable absorbent such as, for example, straw oil, selectively removes the carbonyl sulfide and carbon disulfide from said gases. The gaseous effluent from absorber 56 is recycled to reactor 14 via lines 58, 48, 10 and 16. With the gas in line 58, the composition of the recycle stream is as follows (mol percent): carbon monoxide, 11.2; hydrogen, 11.2; carbon dioxide, 1.1; sulfur, 0.4; methane, 0.06; hydrogen sulfide, 11.6; and the balance nitrogen. Rich absorbent solution is taken from the base of absorber 56 and admitted to the top of regenerating tower 60 through line 62. Lean oil is withdrawn from the bottom of the regenerator 60 and returned to the top of absorber 56 through line 64. Makeup oil is added as required through line 66. Carbonyl sulfide and carbon disulfide liberated from the rich oil are taken overhead through line 68 and sent to cooler 70 which is operated at a temperature of from about 0° to about 20° C. The cooled products are then transferred to separator 72 through line 74 where liquid carbon disulfide is withdrawn therefrom through line 76 and gaseous carbonyl sulfide is removed through line 78. Under the aforesaid conditions, the percent fresh feed sulfur converted is 100 percent, the total feed sulfur converted is 98 percent, and the selectivity of converted sulfur to carbonyl sulfide is 15 percent.

The results secured by substituting carbon dioxide for air in the above process shown in Figure 4 and employing a reactor pressure of 20 atmospheres are reported in tabular form below. All amounts are given on the basis of 100 mols of product gas.

TABLE NO. 2

| Components | Fresh Feed, Mols | Total Feed, Mols | Total Product, Mols | Net Product, Mols | Recycle, Mols |
|---|---|---|---|---|---|
| CO | | 10.5 | 10.5 | | 10.5 |
| $H_2$ | | 0.5 | 0.5 | | 0.5 |
| $H_2O$ | | | 1.1 | 1.1 | |
| $CO_2$ | 15.6 | 20.6 | 5.0 | | 5.0 |
| COS | | | 30.0 | 30.0 | |
| $S_2$ | 37.1 | 37.2 | 0.1 | | 0.1 |
| $CH_4$ | 18.5 | 19.2 | 0.7 | | 0.7 |
| $CS_2$ | | | 4.1 | 4.1 | |
| $H_2S$ | | 12.1 | 48.0 | [1] 35.9 | 12.1 |

[1] Returned to sulfur recovery unit.

Under the above described conditions, the total feed sulfur conversion is 99 percent and selectivity of converted sulfur to carbonyl sulfide is 40 percent.

Owing to the fact that the chemical properties of carbonyl sulfide and carbon disulfide are substantially the same, it will be apparent that by the process of our invention, an appreciable amount of the starting materials employed are converted in effect into a single usable sulfur-containing end product. Thus, for example, carbonyl sulfide reacts similarly to carbon disulfide in the case of alcoholates, mercaptides, amines and the like. The advantages of such a process will be particularly appreciated if it is desired to consume the carbonyl sulfide and carbon disulfide at the plant's site for conversion into other sulfur-containing compounds.

From the foregoing description, it will likewise be apparent that the process of our invention is susceptible of numerous modifications without materially departing from the scope thereof. For example, instead of the carbonyl sulfide-carbon disulfide recovery system described above, we may subject the crude product gases first to an absorption or scrubbing step with ethanol to selectively dissolve the carbonyl sulfide and carbon disulfide, followed by recovery of these products in the previously described manner. The undissolved gases, consisting chiefly of hydrogen sulfide, may then be run through a water absorption system and the hydrogen sulfide separated from other impurities as described above before recycling a portion thereof to a reactor and sending the balance to a sulfur recovery plant. The expression "free oxygen" appearing in the claims is intended to include both air and oxygen streams such as, for example, oxygen enriched air.

We claim:

1. In a process for the production of carbon disulfide and carbonyl sulfide, the improvement which comprises reacting a vaporous mixture containing a normally gaseous hydrocarbon, elemental sulfur and an oxidizing gas selected from the group consisting of free oxygen and carbon dioxide in a reaction zone under conditions of impending carbon deposition, said conditions comprising essentially a temperature of from about 525° to about 925° C., the hydrocarbon, sulfur and oxidizing gas being employed in an amount such that the atomic ratio of S:H ranges from about 0.2 to about 1.0, the atomic ratio of C:H ranges from about 0.2 to about 1.2 and the atomic ratio of O:H ranges from about 0.1 to about 2.0.

2. The process of claim 1 in which the reaction is effected at a pressure ranging from about 1 to about 40 atmospheres.

3. The process of claim 1 in which the reaction is effected at a pressure raging from about 1 to about 40 and at a temperature ranging from about 650° to about 775° C.

4. The process of claim 3 in which carbon dioxide is used as the oxidizing gas.

5. The process of claim 3 in which free oxygen is used as the oxidizing gas.

6. The process of claim 3 in which methane is the hydrocarbon employed.

7. The process of claim 6 in which carbon dioxide is the oxidizing gas.

8. The process of claim 6 in which free oxygen is the oxidizing gas.

9. In a process for the production of carbonyl sulfide, the improvement which comprises reacting a vaporous mixture containing a light hydrocarbon gas consisting essentially of methane, elemental sulfur and an oxidizing gas selected from the group consisting of free oxygen and carbon dioxide in a reaction zone under conditions of impending carbon deposition, said conditions comprising essentially a temperature of from about 700° to about 775° C. and a pressure of from about 20 to about 40 atmospheres, the methane, sulfur and oxidixing gas being employed in an amount such that the atomic ratio of S:H ranges from about 0.2 to about 1.0, the atomic ratio of C:H ranges from about 0.2 to about 1.2, and the atomic ratio of O:H ranges from about 0.1 to about 2.0.

References Cited in the file of this patent

UNITED STATES PATENTS

| | | |
|---|---|---|
| 2,187,393 | De Simo | Jan. 16, 1940 |
| 2,330,934 | Thacker | Oct. 5, 1943 |
| 2,663,622 | Odell et al. | Dec. 22, 1953 |

FOREIGN PATENTS

| | | |
|---|---|---|
| 358,249 | Great Britain | Oct. 8, 1931 |